United States Patent [19]

Tsuyuguchi

[11] Patent Number: 4,816,934
[45] Date of Patent: Mar. 28, 1989

[54] POWER-SAVING READ/WRITE CIRCUIT FOR APPARATUS FOR DIGITAL DATA TRANSFER WITH A MAGNETIC DISK

[75] Inventor: Hiroshi Tsuyuguchi, Tokyo, Japan

[73] Assignee: Teac Corporation, Tokyo, Japan

[21] Appl. No.: 106,145

[22] Filed: Oct. 7, 1987

[30] Foreign Application Priority Data

Oct. 24, 1986 [JP] Japan .................. 61-253468

[51] Int. Cl.$^4$ .................. G11B 15/19; G11B 5/09
[52] U.S. Cl. .................. 360/62; 360/46
[58] Field of Search .................. 360/62, 61, 46, 68

[56] References Cited

U.S. PATENT DOCUMENTS

| | | | |
|---|---|---|---|
| 4,639,794 | 1/1987 | Ferrier | 360/46 |
| 4,651,235 | 3/1987 | Morita et al. | 360/46 |
| 4,656,533 | 4/1987 | Sakai et al. | 360/46 |

OTHER PUBLICATIONS

"The Latest Floppy Dish Drives and Their Application Knowhow", p. 67.

*Primary Examiner*—Vincent P. Canney
*Attorney, Agent, or Firm*—Woodcock, Washburn, Kurtz, Mackiewicz & Norris

[57] ABSTRACT

A magnetic disk drive of the type comprising at least one read/write head assembly having a read/write coil which is center-tapped to provide a pair of coil halves which are alternately excited during writing, and a write terminate resistor connected between the coil halves for preventing the flow of oscillatory current therethrough during writing. In order to electrically isolate the write terminate resistor from the read circuit also coupled to the opposite extremities of the read/write coil, alternating-current switches are connected between the write terminate resistor and the read/write coil so as to be away from the paths of write current through the coil. The alternating-current switches are rendered conductive only during writing.

13 Claims, 4 Drawing Sheets

4,816,934

POWER-SAVING READ/WRITE CIRCUIT FOR APPARATUS FOR DIGITAL DATA TRANSFER WITH A MAGNETIC DISK

BACKGROUND OF THE INVENTION

My invention concerns apparatus for the transfer (reading and writing) of data with magnetic disk media such as, typically, flexible magnetic disks commonly referred to as floppy disks. More specifically, my invention pertains to a read/write circuit of such data transfer apparatus or floppy disk drives featuring provisions for the reduction of voltage and power losses to a minimum.

In the art of digital data transfer with flexible magnetic disks, the magnetic read/write head has been known which has a center-tapped read/write coil, as disclosed for example in Morita et. al. U.S. Pat. No. 4,651,235. The two halves of the read/write coil, as so electrically divided by the center tap, are alternately excited during writing in accordance with the binary-coded write data signal. During reading, then, the center tap is not used, but the desired read data signal is derived from the output from the complete read/write coil.

A problem has existed with this known type of read/write head by reason of the inherent inductance of the read/write coil. as is well known, the inductive coil stores energy as a result of the flow of the write current therethrough. Consequently, the current magnitude in either half of the read/write coil does not immediately become zero each time the flow of the write current terminates. Were it not for a special circuit for taking up such residual current, resonance would take place in the coil due to an inductance-capacitance circuit composed of the inductance of the read/write coil, the capacitance between the conductors connected to each half of the coil and the ground, the capacitance between the conductors connected to both halves of the coil, etc. Thus an oscillatory current would flow through both halves of the coil for some time upon cessation of the flow of the write current through either half of the coil.

A known solution for the elimination of the oscillatory current is the provision of a circuit for the release of the energy stored in the read/write coil. The energy release circuit must be electrically isolated from the read circuit. Conventionally, therefore, a pair of diodes have been connected respectively between the two halves of the read/write coil and the pair of transistors for the alternate excitation of the coil halves, and a socalled write terminate resistor has been connected between the pair of write current lines each extending between one diode and one transistor. The write terminate resistor serves to release the undesired energy of the read/write coil therethrough and hence to reduce the oscillatory current. This known circuit arrangement is incorporated, for example, in the floppy disk drive read/write amplifier IC chip HA16642 manufactured by Hitachi Co., Ltd., as illustrated block-diagrammatically on page 67 of "The Latest Floppy Disk Drives and their Application Knowhow" published June 1984 by CQ Publishing Co., Ltd., of Tokyo, Japan.

I object to the prior art energy release circuit because of the connection of the diodes on the write current paths to the two halves of the read/write coil for isolating the write terminate resistor from the read circuit. I have ascertained by experiment that the diodes cause a voltage drop of approximately 0.7 volt, as well as power loss and heat production, thus running counter to the current demands for the less power consumption and lower voltage driving of magnetic disk apparatus.

SUMMARY OF THE INVENTION

I have hereby succeeded in minimizing the flow of oscillatory current through the center-tapped read/write coil of magnetic disk apparatus without giving rise to any significant voltage drops on the write current paths to the coil.

In summary, in an apparatus for the transfer of digital data with a magnetic record medium such as a flexible magnetic disk in accodance with my invention, the write terminate resistor is coupled to the center-tapped read/write coil via alternating-current switch means positioned away from the write current paths through the coil. Switch control means are provided for causing conduction through the alternating current switch means only during writing. The alternating current switch means, which supersedes the conventional diodes on the write current paths, is well calculated to avoid a voltage drop between the pair of supply terminals connected to the read/write coil.

In a preferred embodiment to be set forth subsequently, in which my invention is shown applied to a disk drive for use with a double-sided flexible magnetic disk, one write terminate resistor is coupled to the read/write coils of two read/write head assemblies via two pairs of alternating current switches. This arrangement is recommended by reason of the simplicity of the circuit configuration.

The above and other features and advantages of my invention and the manner of realizing them will become more apparent, and the invention itself will best be understood, from a study of the following description and appended claims, with reference had to the attached drawings showing preferred embodiment of the invention.

DESCRIPTION OF THE PREFERRED EMBODIMENT

Figure 1:
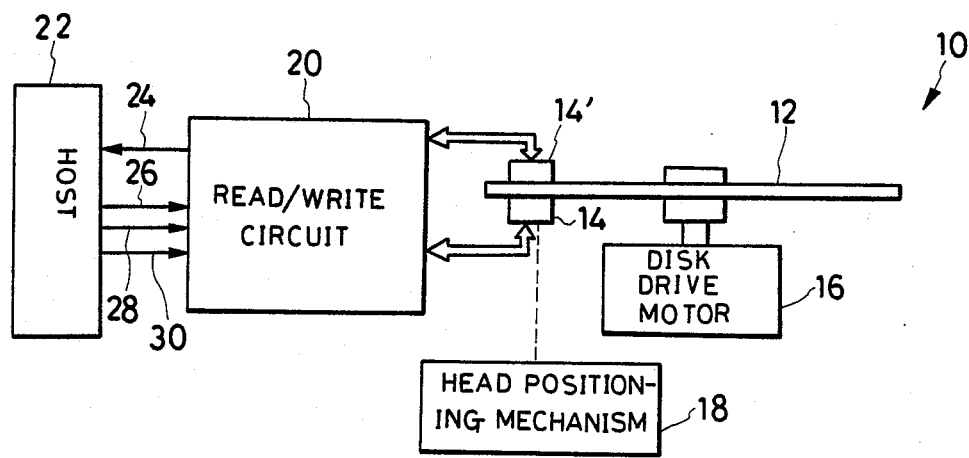
FIG. 1 is a block diagrammatic representation of a typical data transfer apparatus to which my invention finds application.

I have illustrated in FIG. 1 the general construction of a standard disk drive to which my invention is applicable, only insofar as is necessary for a full understanding of the invention. Generally designated 10, the disk drive is shown together with a double-sided flexible magnetic disk 12 mounted in a preassigned data transfer position therein. The disk drive 10 has a pair of read/write head assemblies 14 and 14' of like construction arranged for data transfer with the opposite sides of the magnetic disk 12 as the latter is rotated by a disk drive motor 16. The read/write head assemblies 14 and 14' are both mounted on a head carriage, not shown, which is movable radially of the magnetic disk 12. The unshown head carriage forms a part of a head positioning mechanism, shown in block form and generally labeled 18, whereby the head assemblies 14 and 14' are incrementally transported from track to track on the magnetic disk 12.

Also inluded in the disk drive 10 is a read/write circuit 20 electrically connected to the pair of read/write head assemblies 14 and 14' for controlling the writing on, and reading from, the magnetic disk 12.

As is well known, the disk drive 10 is not a self-contained unit but is under the control of an external host system 22. The read/write circuit 20 is interfaced with the host system 22 via a read data line 24, a write data line 26, a head or side select line 28 and a write gate (read/write select) line 30, to which I will subsequently refer in more detail. Actually, a variety of other interface lines exist between disk drive 10 and host system 22. I have not shown such additional interface lines because they have no particular pertinence to my present invention.

Figure 2:
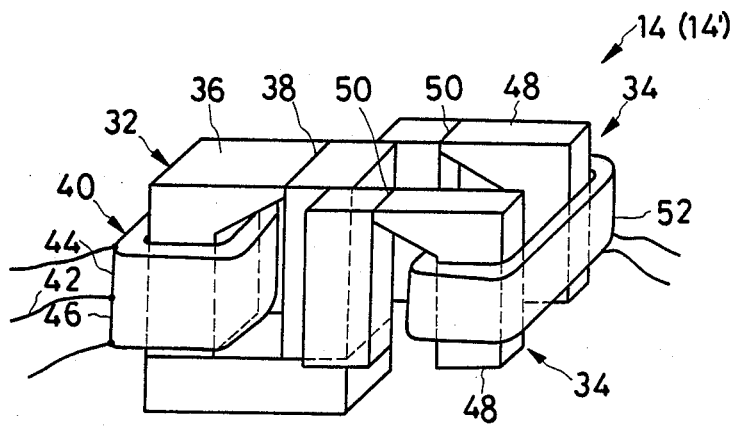
FIG. 2 is a perspective view of one of the two read/write head assemblies in the apparatus of FIG. 1.

FIG. 2 is a detailed illustration of the read/write head assembly 14 of the disk drive 10, it being understood that the other read/write head assembly 14' is of like construction. I have shown the representative read/write head assembly 14 as being of the familiar tunnel erase configuration, comprising a read/write head 32 and a pair of tunnel erase heads 34 disposed on the opposite sides of the read/write head. The read/write head 32 has a magnetic core 36 with a gap 38 defined therein, and a coil 40 wound on the core. The read/write coil 40 has a center tap 42 which electrically divides the coil into a pair of halves 44 and 46. Each tunnel erase head 34 has a magnetic core 48 with a gap 50 defined therein, and a common erase coil 52 is wound on the cores 48 of both tunnel erase heads.

Figure 3:
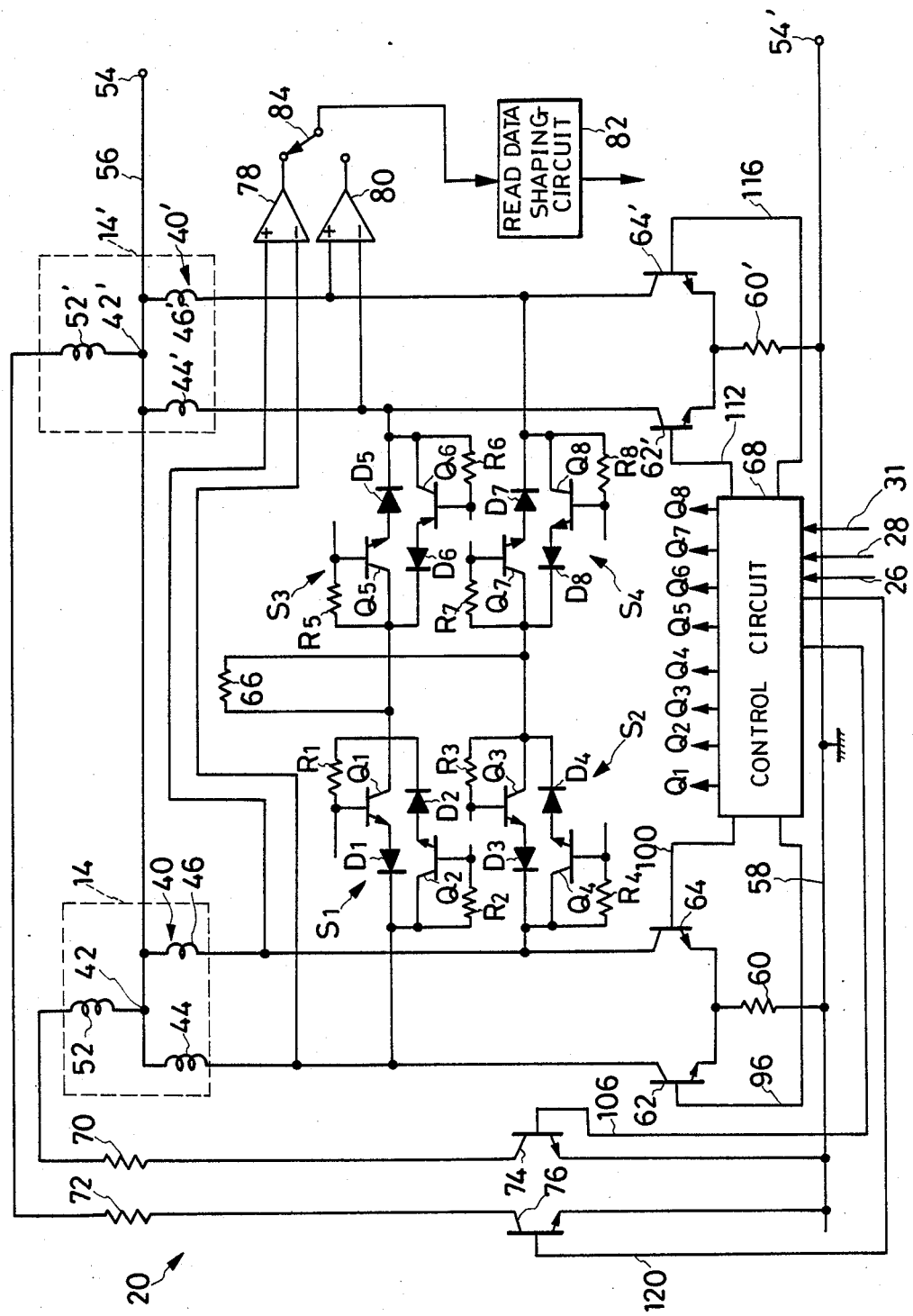
FIG. 3 is a schematic electrical diagram of the read/write circuit in the apparatus of FIG. 1.

I have illustrated in greater detail in FIG. 3 the read/write circuit 20 of FIG. 1 together with the pair of read/write head assemblies 14 and 14'. As electrically represented in FIG. 3 the first head assembly 14 comprises a read/write coil 40, electrically divided into the pair of halves 44 and 46 by the center tap 42, and the erase coil 52 coupled to the center tap 42. The second head assembly 14' likewise comprises a read/write coil 40', electrically divided into a pair of halves 44' and 46' by a center tap 42', and an erase coil 52' coupled to the center tap 42'. I understand, of course, that the center-tapped read/write coil 40' and erase coil 52' of the second head assembly 14' are of the same construction and arrangement as their counterparts 40 and 52 of the first head assembly 14 illustrated in FIG. 2.

The read/write circuit 20 has a pair of DC supply terminals 54 and 54'. The first supply terminal 54 is coupled via a supply line 56 to the center taps 42 and 42' of both read/write head assemblies 14 and 14'. The second supply terminal 54' is coupled to the opposite extremities of the read/write coil 40 of the first head assembly 14 via a common grounding line 58, constant current resistor 60 and respective write switches herein shown as NPN transistors 62 and 64. The second supply terminal 54' is further coupled to the opposite extremities of the read/write coil 40' of the second head assembly 14' via the common grounding line 58, a common constant current resistor 60' and respective write switches or transistors 62' and 64'. The transistors 62, 62, 62' and 64' have all their bases coupled to a control circuit 68 thereby to be actuated on and off.

Hereinafter in this specification I will refer to the read/write coil 40 and erase coil 52 of the first read/write head assembly 14 as the first read/write coil and first erase coil, and to the read/write coil 40' and erase coil 52' of the second read/write head assembly 14' as the second read/write coil and second erase coil, respectively.

Seen at 66 in FIG. 3 is a write terminate resistor for the reduction of oscillatory current flow through the read/write coils 40 and 40' during writing. The write terminate resistor 66 has its opposite extremities coupled to the oposite extremities (coil halves 44 and 46) of the first read/write coil 40 via first and second alternating-current (AC) switches S1 and S2, respectively, and to the opposite extremities (coil halves 44' and 46') of the second read/write coil 40' via third and fourth AC switches S3 and S4, respectively. The first and second AC switches S1 and S2 are to be rendered conductive during writing on one side of the magnetic disk 12 by the first read/write head assembly 14, and the third and fourth AC switches S3 and S4 are to be rendered conductive during writing on the other side of the disk 12 by the second read/write head assembly 14'.

The first AC switch S1 of this particular embodiment comprises a parallel connection of two transistors Q1 and Q2 in opposite orientations, two diodes D1 and D2 connected in series with the respective transistors Q1 and Q2, and two resistors R1 and R2 connected between the collectors and bases of the transistors Q1 and Q2, respectively, for collector-to-base current flow during transistor conduction. The other three AC switches S2-S4 likewise comprise transistors Q3-Q8, diodes D3-D8 and resistors R3-R8 of the same arrangement as their counterparts Q1, Q2, D1, D2, R1 and R2 of the first AC switch S1. All the transistors Q1-Q8 of the AC switches S1-S4 have their bases coupled to the control circuit 68, as indicated, for illustrative convenience, by the headed lines extending from the control circuit.

The first and second erase coils 52 and 52' are connected between supply line 33 and grounding line 58 via resistors 70 and 72 and transistors 74 and 76, respectively. The bases of the transistors 74 and 76 are coupled to the control circuit 68. The transistor 74 is to be rendered conductive during writing by the first read/write head assembly 14, and the transistor 76 is to be rendered conductive during writing by the second read/write head assembly 14'.

First and second operational amplifiers 78 and 80 have their inputs coupled to the opposite extremities of the first and second read/write coils 40 and 40', respectively, for read data detection. The outputs of the operational amplifiers 78 and 80 is coupled to a read data shaping circuit 82 via a head select switch 84.

Figure 4:
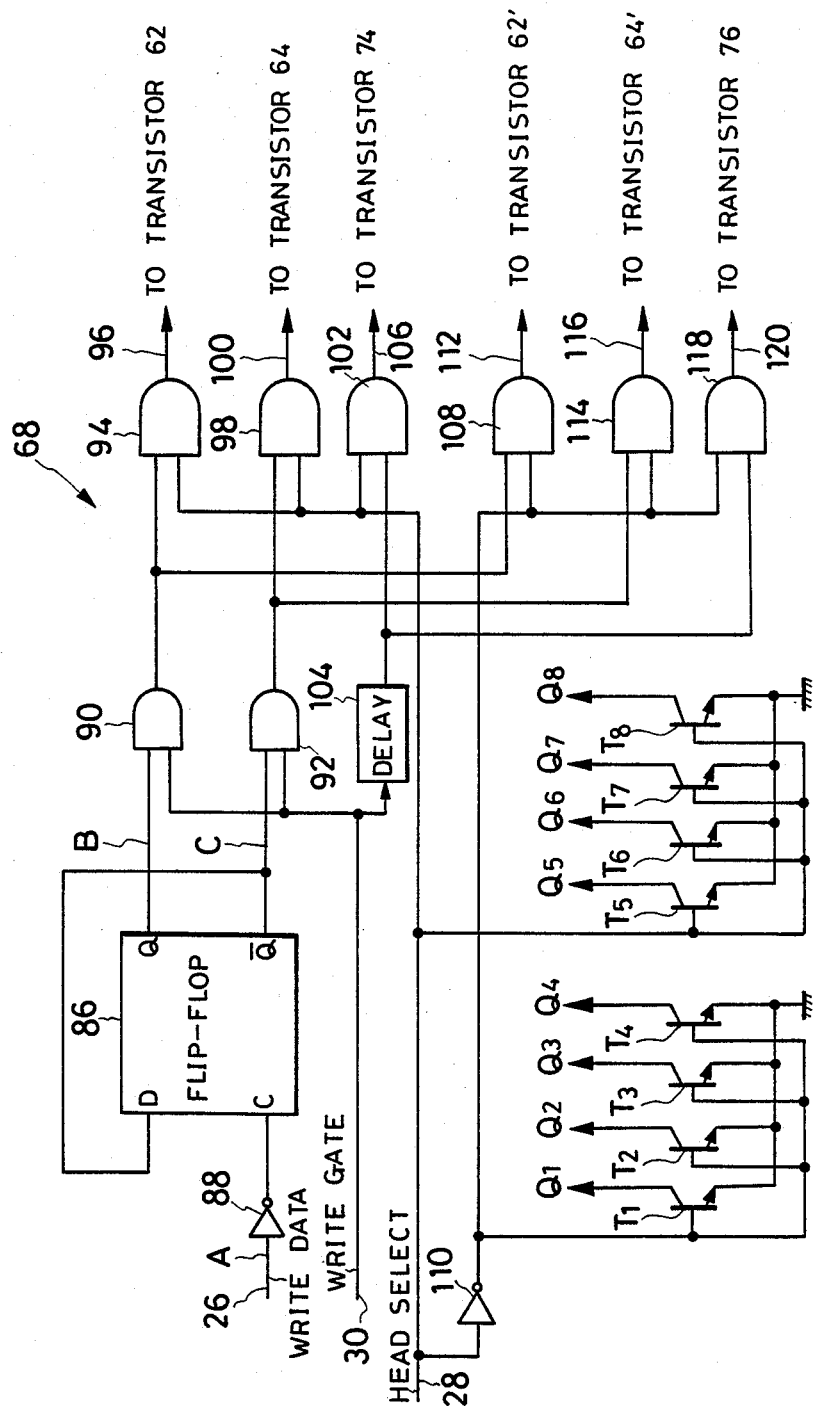
FIG. 4 is a schematic electrical diagram of the control circuit included in the read/write circuit of FIG. 3.

As illustrated in detail in FIG. 4, the control circuit 68 includes a D flip flop 86 having a clock input C coupled to the write data line 8 via a NOT circuit 88. As has been mentioned in connection with FIG. 1, the write data line 8 is coupled to the host 22 for the delivery of the two-level write data signal which has been coded by, for example, the modified frequency modulation (MFM) scheme. The data input D of the D flip flop 86 is connected to its $\overline{Q}$ output. The Q output of the D flip flop 86 is connected to one of the two inputs of AND gate 90, the other input of which is connected to the host 22 via the write gate line 30. The $\overline{Q}$ output of the D flip flop 86 is connected to one of the two inputs of a second AND gate 92, the other input of which is also connected to the host 22 via the write gate line 30.

Figure 5:
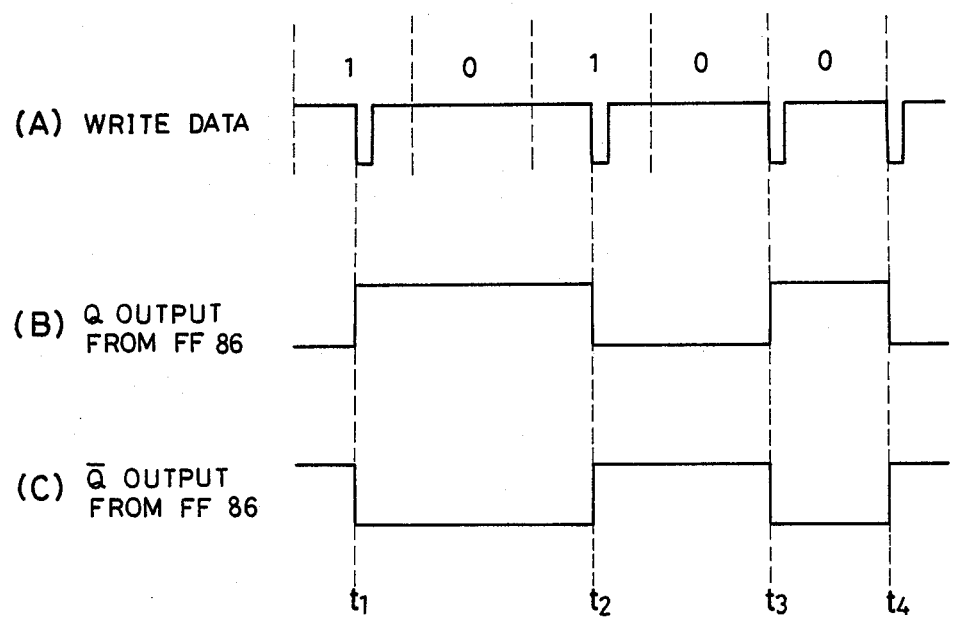
FIG. 5 consisting of A, B and C is a diagram of waveforms appearing in various parts of the control circuit of FIG. 4.

I have illustrated by way of example the MFM write data signal at (A) in FIG. 5, and the corrsponding Q and Q outputs from the D flip flop 86 at (B) and (C) in FIG. 5. The capitals A, B and C in FIG. 4 indicate the parts where the associated signals (A), (B) and (C) of FIG. 5 appear.

As is conventional in the art, the write gate (read-/write select) signal fed over the write gate line 30 goes high for writing, and low for reading. Therefore, only during writing, the AND gates 90 and 92 permit the passage therethrough of the write data signals from the flip flop 86. Both AND gates 90 and 92 remain low during reading. The output of the first AND gate 90 is connected to a third two-input AND gate 94, the other input of which is connected to the host 22 via the head select line 28. The third AND gate 94 has its output connected to the base of the transistor 62, FIG. 3, by way of a line 96. The output of the second AND gate 92 is connected to a fourth two-input AND gate 98, the other input of which is also connected to the host 22 via the head select line 28. The fourth AND gate 98 has its output connected to the base of the transistor 64, FIG. 3, by way of a line 100.

The head select or side select signal over the line 28 goes high for selecting the first read/write head assembly 14, and low for selecting the second read/write head assembly 14'. Accordingly, when the write gate signal over the line 30 and the head select signal over the line 28 are both high, the third and fourth AND gates 94 and 98 will put out signals equivalent to the Q and $\overline{Q}$ outputs from the flip flop 86 which are shown at (B) and (C) in FIG. 5. It will therefore be seen from FIG. 3 that the transistors 62 and 64 coupled to the opposite extremities of the first read/write coil 40 are alternately switched on and off.

The head select signal line 28 is further connected to one of the two inputs of a fifth AND gate 102, the other input of which is connected to the write gate line 30 via a delay circuit 104. The output of this fifth AND gate 102 is connected to the transistor 74, FIG. 3, by way of a line 106. The delay circuit 104 provides a delay time corresponding to the distance between the read/write gap 38 and erase gaps 50 of the head assemblies 14 and 14'.

A sixth AND gate 108 has a first input connected to the first AND gate 90, a second input connected to the head select line 28 via a NOT circuit 110, and an output connected to the base of the transistor 62', FIG. 3, by way of a line 112. A seventh AND gate 114 has a first input connected to the second AND gate 92, a second input connected to the head select line 28 via the NOT circuit 110, and an output connected to the base of the transistor 64', FIG. 3, by way of a line 116. Thus the transistors 62' and 64' coupled to the opposite extremities of the second read/write coil 40' are alternately switched on and off by the Q and $\overline{Q}$ outputs from the flip flop 86 when the write gate signal over the line 30 is high and the head select signal over the line 28 is low.

An eighth AND gate 118 has a first input connected to he head select line 28 via the NOT circuit 110, a second input connected to the write gate line 30 via the delay circuit 104, and an output connected to the base of the transistor 76, FIG. 3, by way of a line 120. It is thus seen that the transistor 76 becomes conductive only when the output from the delay circuit 104 is high and the head select signal over the line 28 is low.

Also included in the control circuit 68 are eight transistors T1–T8, all having their emitters grounded and their collectors coupled respectively to the eight transistors Q1–Q8, FIG. 3, of the read/write circuit 20. Four, T1–T4, of the transistors T1–T8 have their bases connected to the head select line 28 via the NOT circuit 110 whereas the other four transistors T5–T8 have their bases connected directly to the head select line 28. Therefore, when the head select signal over the line 28 is high, the resulting low output from the NT circuit 110 causes nonconduction through the first group of transistors T1–T4 and, in consequence, conduction through the transistors Q1–Q4 of the AC switches S1 and S2 associated with the first read/write head assembly 14. Also, when the head select signal is high, the second group of transistors T5–T8 is conductive thereby causing nonconduction through the transistors Q5–Q8 of the AC switches S3 and S4 associated with the second read/write head assembly 14'.

Operation

For writing on one side of the magnetic disk 12 by the first read/write head assembly 14, the first and second AC switches S1 and S2 and transistor 74 of the read-/write circuit 20 must be on. Desired data can be written on the disk 12 as the transistors 62 and 64 are alternately switched on and off in accordance with the write data.

I will now explain in detail how the write data shown at (A) in FIG. 5 is written on the disk 12 by the first read/write head assembly 14. As the write data is inverted by the NOT circuit 88 and then input to the flip flop 86, its Q output will be high from moment t1 to moment t2, as indicated at (B) in FIG. 5, whereas its $\overline{Q}$ output will be low during the same time interval, as at (C) in FIG. 5. As the transistor 62 becomes conductive at the moment t1 in response to he write data signal, a write current will flow through the circuit comprising the supply line 56, first coil half 44 of the first read/write head assembly 14, transistor 62, resistor 60 and grounding line 58. The transistor 62 will become nonconductive as the Q output from the flip flop 86 goes low at the moment t2.

As the $\overline{Q}$ output from the flip flop 86 goes high at the same moment t2, the transistor 64 will become conductive, providing a write current path comprising the supply line 56, second coil half 46 of the first read/write head assembly 14, transistor 64, resistor 60 and grounding line 58. So fed with the write current from moment t2 to moment t3, the second half 46 of the first read-/write coil 40 will produce in the magnetic core 36, FIG. 2, a magnetic flux oriented in the opposite direction to that of the magnetic flux that has been produced by the first coil half 44 from moment t1 to moment t2.

As has been stated, the control circuit 68 conditions the transistors Q1–Q4 of the first and second AC switches S1 and S2 for conduction during writing by the first read/write head assembly 14. Consequently, upon conduction of the transistor 64 at the moment t2, an energy release circuit will be completed which comprises the first half 44 of the first read/write coil 40, the transistor Q2 and diode D2 of the first AC switch S1, the write terminate resistor 66, the transistor Q3 and diode D3 of the second AC switch S2, the transistor 28, the resistor 60 and the grounding line 58. This energy release circuit will release the energy that has been stored in the first half of the first read/write coil 40, thereby preventing the flow of oscillatory current through the coil.

Similarly, during the subsequent conduction of the transistor 62 in response to the high Q output from the flip flop 86 from moment t3 to moment t4, an energy release circuit will be completed which comprises the second half 46 of the first read/write coil 40, the transistor Q4 and diode D4 of the second AC switch S2, the write terminate resistor 66, the transistor Q1 and diode D1 of the first AC switch S1, the transistor 62, resistor 60 and grounding line 58. This energy release circuit will also serve to take up the energy that has been stored in the second half 46 of the first read/write coil 40, and hence to restrict the flow of oscillatory current through the coil.

As will be understood by referring to both FIGS. 3 and 4, the transistor 54 coupled to the first erase coil 52 is conductive during writing by the first read/write head assembly 14. The first erase coil 52 will therefore be fed from the supply terminal 54 for trimming the opposite edges of the data track being created by the first read/write coil 40. It will also be seen that the transistors 62', 64' and 76 and the AC switches S3 and S4, all associated with the second read/write head assembly 40', are off during writing by the first read/write head assembly 40.

The read/write circuit 20 operates in the same manner for writing by the second read/write head assembly 14' as for writing by the first read/write head assembly 14. Thus, during writing by the second head assembly 14', the third and fourth switches S3 and S4 and transistor 76 will all be conductive, and the transistors 62' and 64' will be alternately switched on and off as dictated by the write data signal fed from the host 22 over the line 26. The conduction of the transistor 62' will provide a write current path comprising the supply line 56, first half 44' of the second read/write coil 40', transistor 62' resistor 60' and grounding line 58. The conduction of the other transistor 64' will provide a write current path comprising the supply line 56, second half 46' of the second read/write coil 40', transistor 64', resistor 60' and grounding line 58.

It will also be apparent that two different energy release circuits are established with the alternate conduction of the transistos 62' and 64' during writing by the second read/write head assembly 14'. The energy release circuit during the conduction of the transistor 62' comprises the second half 46' of the second read/write coil 40', the transistor Q8 and diode D8 of the fourth AC switch S4, the write terminate resistor 66, the transistor Q5 and diode D5 of the third AC switch S3, the transistor 62', the resistor 60' and the grounding line 58. The energy release circuit during the conduction of the transistor 64'comprises the first half 44' of the second read/write coil 40', the transistor Q6 and diode D6 of the third AC switch S3, the write terminate resistor 66, the transistor Q7 and diode D7 of the fourth AC switch S4, the transistor 64', the resistor 60' and the grounding line 58. These energy release circuits will function just like those formed during writing by the first read/write head assembly 14, effectively preventing the flow of oscillatory current through the second read/write coil 40'.

As the transistor 76 remains conductive during writing by the second read/write head assembly 14', the second erase coil 52' will be energized for trimming the edges of the data tracks being formed by the second head assembly.

For reading by the first read/write head assembly 14 the control circuit 68 cause nonconduction through all the transistors 62', 64, 62', 64', 74 and 76 and through all the AC switches S1–S4, with the consequent isolation of the write terminate resistor 66 from the read/write coils 40 and 40'. The voltages induced in the complete first read/write coil 40 in accordance with the data that has been written on the magnetic disk 12 will be detected by the first operational amplifier 78, and the output from this amplifier will be delivered to the shaping circuit 82 via the switch 84. I understand that the switch 84 connects the first amplifier 78 to the shaping circuit 82 under the control of the control circuit 68 during reading by the first read/write head assembly 14. Of course, for reading by the second read/write head assembly 14', the switch 84 will connect the second operational amplifier 80 to the shaping circuit 82.

Possible Modifications

Despite the foregoing detailed disclosure I do not wish my invention to be limited by the exact details of such disclosure. The following is a brief list of possible modifications or alterations of the illustrated embodiment which I believe all fall within the scope of my invention:

1. Only one read/write head assembly could be provided for data transfer with a single-sided magnetic disk, with the write terminate resistor coupled to the opposite extremities of the center-tapped read/write coil of the single head assembly via one pair of AC switches.

2. All or some of the transistors used in the read/write circuit of FIG. 3 could be field-effect transistors.

3. The transistors 24, 28, 24'and 28'could be coupled to the grounding line 58 via respective resistors, instead of via the common resistors 60 and 60', or could share one resistor or equivalent constant current means.

4. NAND gates could be substituted for the AND gates 90, 92, 94, 98, 102, 108, 114 and 118, and PNP transistors for the NPN transistors 62', 64, 62', 64', 74 and 76.

What I claim is:

1. In an apparatus for the transfer of digital data with a magnetic record medium such as a flexible magnetic disk, the digital data to be written on the record medium being supplied in the form of a two-level write data signal, in combination:
 (a) first and second direct-current supply terminals;
 (b) a magnetic read/write head for writing digital data on, and reading the same from, the record medium, the read/write head comprising a magnetic core with a read/write gap, a read/write coil wound around the core, and a center tap on the read/write coil electrically dividing the same into first and second halves and connected to the first supply terminal;
 (c) a read circuit connected between the opposite extremities of the read/write coil;
 (d) a first write switch connected between the first half of the read/write coil and the second supply terminal;
 (e) a second write switch connected between the second half of the read/write coil and the second supply terminal;
 (f) write data supply means for providing the two-level write data signal representative of desired digital data to be written on the record medium;
 (g) read/write select means for providing a read/write select signal indicative of whether the read/write head is to be used for reading or writing;

(h) write switch control means connected to the first and second write switches and the write data supply means and the read/write select means for alternately actuating the first and second write switches on and off each time the write data signal changes from one level to the other during writing;

(i) a write terminate resistor connected between the opposite extremities of the read/write coil;

(j) alternating-current switch means connected in series with the write terminate resistor and in a position away from between the read/write coil and the first and second write switches; and (k) alternating-current switch control means connected to the alternating-current switch means means for causing conduction therethrough means during writing.

2. The data transfer apparatus of claim 1 wherein each of the first and second write switches comprises a transistor.

3. The data transfer apparatus of claim 1 wherein the alternating-current switch means comprises an alternating-current switch connected between one extremity of the read/write coil and the write terminate resistor.

4. The data transfer apparatus of claim 3 wherein the alternating-current switch comprises a pair of transistors connected in parallel with each other and oriented in opposite directions.

5. The data transfer apparatus of claim 3 wherein the alternating-current switch means comprises another alternating-current switch connected between the other extremity of the read/write coil and the write terminate resistor.

6. The data transfer apparatus of claim 5 wherein each alternating-current switch comprises a pair of transistors connected in parallel with each other and oriented in opposite directions.

7. The data transfer apparatus of claim 1 further comprising constant current means connected between the first and second write switches and the second direct-current supply terminal.

8. The data transfer apparatus of claim 7 wherein the constant current means comprises a resistor.

9. In an apparatus for the transfer of digital data with a double-sided flexible magnetic disk or like record medium, the digital data to be written on the record medium being supplied in the form of a two-level write data signal, combination:

(a) first and second direct-current supply terminals;

(b) first and second magnetic read/write heads for writing digital data on, and reading the same from, the opposite sides of the record medium, each read/write head comprising a magnetic core with a read/write gap, a read/write coil wound around the core, and a center tap on the read/write coil electrically dividing the same into first and second halves and connected to the first supply terminal;

(c) a first read circuit connected between the opposite extremities of the read/write coil of the first read/write head for inputting read data output therefrom;

(d) a second read circuit connected between the opposite extremities of the read/write coil of the second read/write head for inputting data data output therefrom;

(e) a first write switch connected between the first half of the read/write coil of the first read/write head and the second supply terminal;

(f) a second write switch connected between the second half of the read/write coil of the first read/write head and the second supply terminal;

(g) a third write switch connected between the first half of the read/write coil of the second read/write head and the second supply termnal;

(h) a fourth write switch connected between the second half of the read/write coil of the second read/write head and the second supply terminal;

(i) write data supply means for providing the two-level write data signal representative of desired digital data to be written on the record medium;

(j) read/write select means for providing a read/write select signal indicative of whether the read/write heads are to be used for reading or writing;

(k) head select means for providing a head select signal indicative of whether the first or second read/write head is to be used for data transfer with the record medium;

(l) write switch control means connected to the first to fourth write switches and the write data supply means and the read/write select means and the head select means for alternately actuating the first and second write switches on and off each time the write data signal changes from one level to the other during writing by the first read/write head, and for alternately actuating the third and fourth write switches on and off each time the write data signal changes from one level to the other during during by the second read/write head;

(m) a write terminate resistor having first and second electrical ends;

(n) a first alternating-current switch connected between the first half of the read/write coil of the first read/write head and the first end of the write terminate resistor;

(o) a second alternating-current switch connected between the second half of the read/write coil of the first read/write head and the second end of the write terminate resistor;

(p) a third alternating-current switch connected between the first half of the read/write coil of the second read/write head and the first end of the write terminate registor;

(q) a fourth alternating-current switch connected between the second half of the read/write coil of the second read/write head and the second end of the write terminate resistor; and (r) alternating-current switch control means connected to the first to fourth alternating-current switches and the head select means for causing conduction through the first and second alternating-current switches during writing by the first read/write head, and through the third and fourth alternating-current switches during writing by the second read/write head.

10. The data transfer apparatus of claim 9 wherein each of the first to fourth write switches comprises a transistor.

11. The data transfer apparatus of claim 9 wherein each of the first to fourth alternating-current switches comprises a pair of transistors connected in parallel with each other and oriented in opposite directions.

12. The data transfer apparatus of claim 9 further comprising constant current means connected between the first to fourth write switches and the second direct-current supply terminal.

13. The data transfer apparatus of claim 12 wherein the constant current means comprises a resistor.

* * * * *

UNITED STATES PATENT AND TRADEMARK OFFICE
CERTIFICATE OF CORRECTION

PATENT NO. : 4,816,934
DATED : Mar. 28, 1989
INVENTOR(S) : Hiroshi Tsuyuguchi

It is certified that error appears in the above-identified patent and that said Letters Patent is hereby corrected as shown below:

Cover page, under "Other Publications", change "Dish" to --Disk--.

Col. 1, line 28, "as" should be --As--.

Col. 2, line 13, "accodance" should be "accordance--.

Col. 4, line 12, change "oposite" to --opposite--.

Col. 6, line 36, change "he" to --the--.

Col. 8, line 38, change the first occurrence of "62'" to --62--.

Col. 10, line 6, "termnal" should be --terminal--.

Signed and Sealed this

Second Day of January, 1990

*Attest:*

JEFFREY M. SAMUELS

*Attesting Officer*　　*Acting Commissioner of Patents and Trademarks*